Patented Mar. 2, 1954

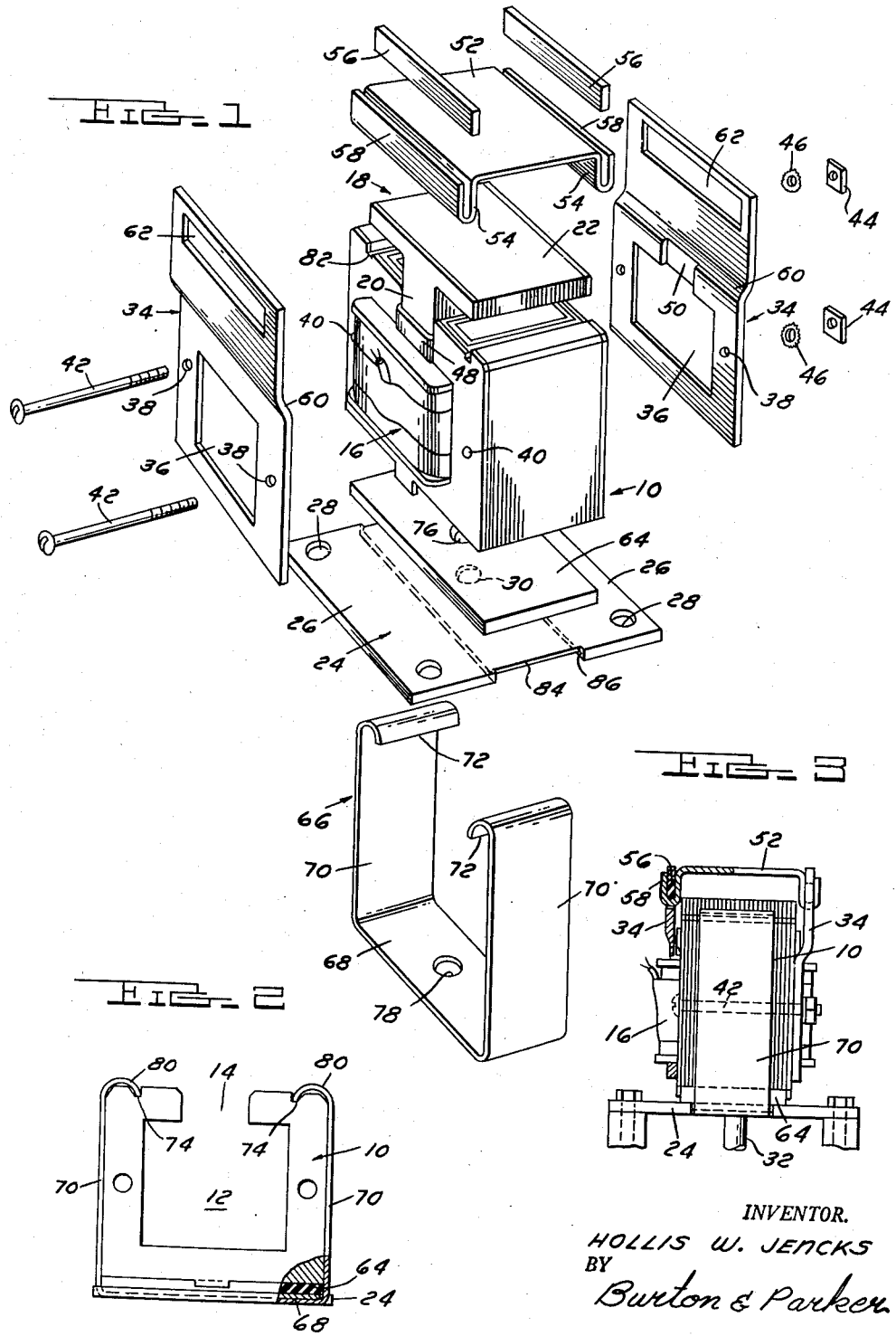

2,671,187

UNITED STATES PATENT OFFICE 2,671,187

SHOCK MOUNTING FOR SOLENOIDS

Hollis W. Jencks, Detroit, Mich., assignor to Carlos C. Cleverdon, doing business as Detroit Coil Company, Detroit, Mich.

Application January 2, 1952, Serial No. 264,448

11 Claims. (Cl. 317—195)

This invention relates to solenoid types of electro-magnets and particularly to improvements in a shock mounting for the armature of such solenoids. This invention constitutes a further improvement of the type of solenoid assembly illustrated and described in my co-pending application for U. S. Patent, Serial No. 171,369, filed June 30, 1950.

An important object of the present invention is to provide an improved solenoid construction and particularly to provide an improved assembly of parts for the solenoid which is highly efficient in absorbing the shock of the impact of the solenoid plunger or armature. Another important object of the invention is to provide an improved solenoid construction which is designed in a novel manner to absorb the shock of impact of the armature at both ends of its stroke, the shock absorbing mediums employed for such purpose being so arranged and located that they obtain the desired cushioning effect without appreciably increasing the overall dimensions of the solenoid. A further important object of the invention is to provide a novel shock absorbing mounting for cushioning the impact of the armature or plunger against the stator or core frame of the solenoid which reduces wattage loss and the amount of heat generated by the solenoid. A still further important object of the invention is to provide a shock absorbing mounting for cushioning the impact of the armature against the core frame which is easy to assemble and places the cushioning medium under initial compression.

In carrying out the objects of the invention, a solenoid constructed in accordance with this invention includes as the major operating elements a coil winding, a stator or core structure enclosing the coil winding on at least two sides thereof, and an armature or plunger reciprocable in the coil winding. The shock absorbing means of the solenoid includes a back stop plate which extends across the path of movement of the armature or plunger in position to be struck thereby at one end of its stroke. The back stop plate cooperates with side plates secured to the core structure to absorb the shock of impact of the plunger against the back stop plate. The shock absorbing means further includes a yieldable member or pad arranged in a novel manner for absorbing the impact of the plunger against the core frame at the opposite end of its stroke. The resilient member is interposed between the core structure and a base plate utilized for securing the solenoid to a fixed support. The base plate together with the resilient member are detachably connected to the core structure for convenient assembly and disassembly and in a novel manner such as to place the resilient member under compression. The parts are so interconnected that a unitary assembly results which is compact, durable and capable of being readily disassembled for replacement of parts.

The yieldable member provided for cushioning the impact of the plunger against the core frame is preferably in the form of a pad composed of resilient insulating material. The pad's location serves to float the core frame on the base plate. This has the added advantage of eliminating the shorting of the laminations of the core frame thereby reducing wattage loss and the amount of heat generated by the solenoid unit. The core frame, pad and base plate are joined into a unitary assembly by a novel form of a one-piece metallic spring strap which holds the pad firmly in place and under slight compression.

Various other objects, advantages and meritorious features of the invention will become more fully apparent from the following specification, appended claims and accompanying drawings wherein:

Fig. 1 is an exploded perspective view of the parts of a solenoid constructed in accordance with this invention, Fig. 2 is an end elevation of the core structure of the solenoid in Fig. 1 showing the base plate and shock absorbing pad assembled thereon, and Fig. 3 is a side elevation of the assembled solenoid of Fig. 1 partly broken away in section.

The present invention relates to improvements in the type of solenoid disclosed in the U. S. Patent No. 2,466,592, dated April 5, 1949, and in the solenoid assembly disclosed in applicant's co-pending application for U. S. patent Serial No. 171,369, filed June 30, 1950.

In the embodiment of the invention illustrated in the drawing, the electro-magnetic device or solenoid comprises a magnetic stator or frame in the form of a core structure generally indicated at 10 and having a substantially C-shaped configuration. The core frame 10 is formed of a multiplicity of soft iron laminations as is the conventional practice. The core frame 10 exhibits a central aperture 12 opening through the opposite sides thereof and is further provided with a smaller passage or slot 14 opening out through the upper end of the frame. The result is a C-shaped configuration as shown in Fig. 2 but it is understood that the invention is applicable to other types of core structures.

Removably received in the central aperture 12 of the core frame is a separate energizing coil unit generally indicated at 16. As described in the aforesaid U. S. Patent No. 2,466,592, the coil winding is provided with a central passage therein which opens out through either one or both of the opposite ends thereof. The coil unit is removable slidably inserted through one side of the core frame in the manner described in the aforesaid patent and is mounted with its central passage aligning with the passage or slot 14 of the core frame. An armature in the form of a reciprocating plunger generally indicated at 18 constitutes the moving part of the assembly and in accordance with the customary practice it may be built of a multiplicity of relatively thin laminations of magnetic material. In the illustrated embodiment of the invention the plunger is shown as T-shaped having a shank portion 20 and a widened head portion 22.

A base plate 24 is provided for supporting the assembly thus far described and as shown in the drawing is located on the side of the core frame 10 opposite to the slot 14 thereof. The base plate has a lateral dimension in one direction greater than the width of the core frame so that opposite marginal portions 26—26 thereof project beyond the opposite sides of the core frame. Holes 28 are provided in the marginal portions for facilitating attachment of the solenoid to any suitable support. The base plate may be further provided with a central hole 30 located in alignment with the opening or slot 14 and through which a stem portion 32 of the plunger may project.

Associated with the solenoid and forming movable parts thereof are two generally similarly formed side plates generally indicated at 34—34. These side plates are preferably similar in shape and formation to one another and follow the general contour of the side frame against which they abut in assembled position. Each side plate is provided with the central opening 36 which may be of the rectangular formation shown in Fig. 1 and further provided with a pair of holes 38—38 located on opposite sides thereof. The holes 38—38 align with holes 40 formed in the core frame which may extend completely therethrough and open out on the opposite sides thereof. A pair of bolt members 42—42 are provided for extending through the holes 38—38 of the side plates and completely through the holes 40 of the core frame in the manner shown in Fig. 3. By means of nuts 44—44 together with lock washers 46—46 on the extremities of the bolts, the side plates are tightly held against the core frame in the manner shown in Fig. 3. In the final assembled position of the parts, the coil winding 16 projects through the central opening 36 of each side plate.

As shown and described in the aforesaid patent, the coil unit 16 may be provided with a sleeve lining disposed in the central passage thereof and through which the shank portion of the plunger reciprocates.

The upper end of such a sleeve lining is shown at 48 projecting above the coil unit and entering the transverse opening or slot 14 of the core frame. Since the sleeve liner 48 projects slightly from the opposite sides of the core frame 10 as indicated in Fig. 1, the side plates 34—34 are preferably cut away or recessed on their inner faces as indicated at 50 for accommodating the sleeve lining in order to bring the side plates flush against the core frame.

For cushioning the impact of the armature or plunger 18 at one end of its stroke, there is provided a back stop member which extends over the head portion 22 of the plunger and is resiliently connected to the side plates 34—34. In the exploded view of Fig. 1, the back stop member is indicated at 52 and comprises a flat metal plate which has a width sufficient to straddle or bridge the space between the side plates. The plate 52 is provided with similar depending wall portions 54—54 on opposite sides thereof which extend in juxtaposed relation to the side plates 34—34. The depending wall portions 54—54 are shaped to cooperate with the side plates to absorb the shock of the impact of the plunger against the back stop plate as hereinafter described.

Interposed between the back stop plate 52 and the side plates 34—34 are two similar bodies of resilient compressible cushioning material indicated 56—56. Each elongated body is in the form of an elongated flat narrow strip of rectangular cross section. In assembled position these strips of resilient material serve to absorb the shock of the impact of the plunger upon the back stop plate 52 and they may be composed of any suitable material for this purpose such as synthetic rubber or leather, or a composition combining both of these materials.

The back stop plate 52 is shaped so receive the resilient strips 56—56 and support the latter out of contact with the plunger and in position to compressively engage the side plates 34—34. For this purpose, the depending side wall portions 54—54 of the back stop plate are similarly shaped at their lower ends to provide the laterally projecting portions which extend first outwardly and thence upwardly to form correspondingly shaped flanges 58—58 along each side of the back stop plate. As a result of this construction, the opposite sides of the back stop plate are shaped to form upwardly opening channels each capable of receiving one of the resilient compressible strips 56. In the assembled position of the parts, as will be described more particularly hereinafter, each strip 56 is received in its respective channel as shown in Fig. 3 with one longitudinal edge thereof bearing against the bottom of the channel and the opposite longitudinal edge thereof substantial abutting the upper edge of the adjacent side plate.

As illustrated herein, the turned down side portions 54—54 of the back stop plate extend between the core frame 10 and the upper portions of the side plates 34—34. To accommodate these turned down portions and to provide a relatively smooth exterior to the device, the upper end portions of the side plates are displaced outwardly relative to the core frame in order to provide the necessary clearance therebetween to receive the turned down portions 54—54 of the back stop plate. As shown at 60, each side plate 34 is provided with a jog which offsets the plane of its upper end portion outwardly laterally relative to its lower end portion.

The back stop plate 52 is interlockingly engageable with the upper ends of the side plates 34—34 and supported thereby across the path of movement of the plunger and in position to be struck by the latter at the end of its outward stroke. To provide interlocking engagement, the upper end portion of each side plate 34 is provided with an elongated opening or slot 62 which extends substantially parallel to the upper edge. The opening 62 of each side plate has a longitudinal dimension slightly greater than the adjacent channel shaped flange of the back stop member but a width slightly less than the depending wall 54 and the flange 58 of each channel, as shown in Fig. 3. The dimensional relation of the elements is such that the flanges 58—58 of the back stop member cannot be introduced into the openings or slots 62 by a straight line motion. However, each flanged edge of the back stop plate can be interengaged with each opening 62 of the side plate by initially inclining one at an acute angle to the plane of the other to hook the upper end of the side plate in to the channel shaped flange of the back stop plate and then thereafter swinging the side plate to a position perpendicular to the back stop plate.

In the final assembled position of the parts the two side plates 34—34 extend vertically and the back stop plate 52 extends horizontally and is supported by the side plates in bridging relation over the armature or plunger 18. In this manner, the back stop plate is floatingly supported by the side plates across the path of movement of the plunger in position to be struck by the head portion 22 thereof when the plunger is retracted.

For cushioning the impact of the armature or plunger 18 at the opposite end of its stroke, there is provided a body in the form of a relatively flat resilient member or pad 64 which is interposed between the base plate 24 and the bottom side of the core frame 10. The pad 64 is preferably of rectangular formation as shown and of a size to underlie the core frame with little or none of the material of the pad projecting outwardly beyond the frame. The stator or core frame is provided on opposite sides with depending portions 17 which overlap the cushion pad 64 and serve to retain the same in place against lateral displacement during operation of the device. This is shown in Figs. 1 and 3.

For convenient assembly and disassembly, as well as to place the resilient pad 64 under initial compression, there is provided a fastener 66 of the U-shaped character shown in Fig. 1 which is proportionately designed to fit around the base plate 24 and hook on to the upper end of the core frame. The fastener is preferably a metallic strap of spring steel bent into the U-shape form illustrated in Figs. 1 and 2 and includes an intermediate base portion 68 and two similar upstanding parallel side portions 70—70. The upper or outer ends of the side portions or legs 70—70 are shaped for detachable engagement with the core frame 10 and as shown are turned inwardly at 72—72 to form the hooks. To receive these hooks, the upper end of the core frame 10 is provided with a pair of correspondingly formed transverse grooves 74—74 situated inside of its outermost dimensions and in position to receive the rolled over ends 72—72 of the strap.

To hold the fastener or strap 66 against lateral movement relative to the base plate 24, the latter may be provided with a longitudinal groove 76 cut into the underside thereof and extending from one edge to the opposite edge thereof as shown in Figs. 1 and 2. This groove is preferably of the same dimension and thickness as the base portion 68 of the metallic strap so that when the latter is received within the groove it does not project beyond the bottom side of the base plate. Furthermore, the side edges of the base plate through which the groove 76 opens may be cut away slightly as at 86 to receive the side portions or legs 70—70 of the metallic strap and bring the latter within the opposite portions of the base plate. As shown in Fig. 2 which illustrates the core frame assembly separate and apart from the balance of the device, the hook ends of the metallic strap are received in the grooves 74—74 thereby drawing the base plate 24 against the pad 64 and holding the latter in slight compression against the underside of the core frame. In order to receive the operating extension or stem portion 32 on the lower end of the plunger or armature, the pad 64 and the base portion 68 of the metallic strap are provided with holes 76 and 78 respectively which in assembled position align with one another and the hole 30 in the base plate.

The U-shaped fastener 66 is applied to the solenoid core frame by a snap-on action. The base plate 24 and the pad 64 are first cradled on the base portion 68 of the fastener. The leg portions 70—70 on the fastener are slid in straddling relation onto the core frame 10 and in the course of this assembly operation the leg portions are resistantly spread apart to a diverging angle as the rolled-in ends 72—72 ride on the core frame. In the final assembled position, the turned-in ends 72—72 snap into the grooves 74—74. The result is that shown in Fig. 2 wherein the inwardly rolled ends of the fastener act to resiliently urge the base plate toward the core frame and place the pad under initial compression. The snap-on functionability of the fastener enables it to be quickly installed upon and detached from its mounting on the solenoid.

The base plate 24 is utilized to mount the solenoid assembly on any suitable support. There is shown in Fig. 3 a plurality of posts 80 arranged to be received in and support the four corners of the base plate. The projecting stem portion 32 of the plunger is centrally disposed among the posts for operating connection with an object to be moved by the solenoid.

As a result of this invention there is provided a solenoid unit of compact proportions which is designed to absorb the shock of impact of the armature or plunger at the opposite ends of its stroke. The impact of the plunger against the back stop plate is taken by the resilient pad 54. The latter serves to cushion or float the core frame on the base plate. The snap-on metallic strap 66 eliminates any direct rigid connection between the core frame and base plate, such as soldering or brazing, and thereby saves time and labor which would be otherwise consumed in connecting these parts together. In addition to absorbing the shock of impact of the plunger against the frame, the resilient material of which the pad 64 is formed serves as an insulating medium and prevents shorting of the laminations of the frame. This reduces the wattage loss and the heat generated by the use of the solenoid.

What I claim is:

1. In an electromagnet including a stator and a winding therefor, said stator being provided with poles extending around the winding on opposite sides thereof and upwardly therebeyond, an armature having a shank portion adapted to move into said winding and further having a widened head portion overlying the ends of said poles, said armature adapted upon movement into the winding to strike its head portion against the ends of said poles, a base plate for mounting the electromagnet upon a fixed support, said base plate underlying the side of the stator opposite to the poles, a flat pad of resilient material interposed between and facially engaging the base plate and said side of the stator and operable to absorb the shock of the striking engagement of the head portion of the armature against the pole extensions, and tensioning means clamping the base plate to the stator and placing the resilient pad under initial compression.

2. In a solenoid, a coil winding, a C-shaped core frame extending around the coil winding, a reciprocating magnetically attractable plunger having a shank portion extending into the coil winding and having a widened head portion adapted to strike the core frame at one end of its stroke, a back stop plate positioned across the path of travel of the plunger in spaced relation to the core frame and adapted to be struck by the plunger at the opposite end of its stroke, a base plate for mounting the solenoid on a fixed support, a pair of side plates overlapping two opposite sides of the core frame and connected therewith, said side plates coupled with the back stop plate through resilient shock absorbing means tensioning the back stop plate through said shock absorbing means toward the core frame, resilient shock absorbing means interposed between the core frame and the base plate, a U-shaped clamp embracing the base plate and overlapping two other opposite sides of the core frame and connected therewith tensioning the base plate through said shock absorbing means against the core frame.

3. In a solenoid, a coil winding, a C-shaped core frame generally surrounding the coil winding, a reciprocating magnetically attractable plunger having a shank portion extending into the coil winding and further having a widened head portion adapted to strike one end of the core frame at the inner end of its stroke, a back stop plate positioned across the path of travel of the head portion of the plunger on the side thereof opposite to the core frame and adapted to be struck by the head portion at the outer end of its stroke, mechanism connecting the back stop plate with opposite sides of the core frame including resilient cushioning means adapted to absorb the shock of the plunger striking the back stop plate, a base plate for mounting the solenoid on a fixed support, said base plate underlying the end of the core frame opposite to that struck by the head portion of the plunger, a flat pad of resilient cushioning material interposed between and facially engaging the base plate and the adjacent end of the core frame and operable to absorb the shock of the striking engagement of the head portion of the plunger against the core frame, and a flexible metallic strap enclosing the base plate and opposite side portions of the core frame, the opposite ends of the strap being detachably connected to the core frame and acting to hold the base plate against the pad tensioning the same toward the core frame through the flat resilient pad.

4. In a solenoid, a coil winding, a generally C-shaped core frame extending around the coil winding, a reciprocatingly magnetically attractable plunger having a shank portion extending into the coil winding and further having a widened head portion adapted to strike one end of core frame at the inner end of its stroke, a base plate for mounting the solenoid on a fixed support, detachable resilient means yieldably drawing the base plate against the underside of the core frame, and a flat pad of resilient material interposed between and facially engaging the base plate and the underside of the core frame, said pad being operable to absorb the shock of the striking engagement of the head portion of the plunger against the core frame.

5. In an electromagnet including a core frame and a magnetically attractable plunger reciprocatingly mounted in the frame, a pair of side plates for the core frame positioned on opposite sides thereof, a back stop plate overlying the upper end of the core frame and extending across the path of movement of the plunger so as to be struck by the plunger at the outer end of its stroke, said back stop plate having the opposite side marginal portions thereof projecting into juxtaposition with respect to the upper marginal portions of the side plates, resilient means interposed between the juxtapositioned marginal portions of the back stop plate and the side plates and acting to absorb the shock of the striking engagement of the plunger against the back stop plate, a base plate underlying the lower end of the core frame opposite to the back stop plate, and resilient means interposed between the base plate and the lower end of the core frame and functioning to absorb the shock of the striking engagement of the plunger against the core frame at the inner end of its stroke.

6. In an electromagnet including a core frame and a magnetically attractable plunger vertically reciprocatingly mounted in the frame, a pair of side plates for the core frame positioned on two opposite sides thereof, a back stop plate overlying the upper end of the core frame and extending across the path of movement of the plunger so as to be struck by the plunger at the outer end of its stroke, said back stop plate having the opposite side marginal portions thereof projecting into juxtaposition with respect to the outer marginal portions of the side plates, cushioning means interposed between the juxtapositioned marginal portions of the back stop plate and the outer marginal portions of the side plates and acting to absorb the shock of the striking engagement of the plunger against the back stop plate, a base plate underlying the lower end of the core frame, a pad of cushioning material interposed between the base plate and the lower end of the core frame and functioning to absorb the shock of the striking engagement of the plunger against the core frame at the inner end of its stroke, and a generally U-shaped flexible metallic strap embracing the two remaining opposite sides of the core frame and extending around the base plate, and means connecting the strap to the core frame and drawing the base plate compactly against the pad.

7. In an electromagnet, an energizing coil having an end opening central passage therein, a core frame having pole extensions extending along the outside of said coil and parallel to the axis of its passage, an armature for the electromagnet including a shank portion adapted to reciprocate in said passage of the coil and having a widened head portion adapted to overlie the upper ends of said pole extensions and strike the same when the plunger is attracted by energization of the coil, a base plate underlying the base of the core frame on the side thereof opposite to the widened head portion of the armature, a flat pad of cushioning material interposed between the base plate and the base of the core frame, means detachably connecting the base plate to the core frame and acting to yieldingly draw the base plate toward the core frame to compactly hold the pad between the base plate and the adjacent end of the core frame, a back stop plate overlying the head end of the armature spaced from the ends of the pole extensions, means interconnecting opposite sides of the back stop plate with the core frame, and resilient cushioning elements interposed between said means and the back stop plate.

8. In an electromagnet, an energizing coil having an end opening central passage therein, a core frame having pole extensions extending along the outside of said coil and parallel to the axis of its passage, an armature for the electromagnet including a shank portion adapted to reciprocate in said passage of the coil and having a widened head portion adapted to overlie the upper ends of said pole extensions and strike the same when the plunger is attracted by energization of the coil, a base plate underlying the core frame and disposed on the side thereof opposite to the widened head portion of the armature, a flat pad of cushioning material interposed between the base plate and the adjacent end of the core frame, a generally U-shaped member embracing two opposite sides of the core frame and extending around the base plate, the ends of the arms of the U-shaped member being bent into engagement with the core frame and acting to draw the base plate toward the core frame to compactly hold the pad between the base plate and the adjacent end of the core frame, a generally U-shaped assembly the base of which comprises a back stop plate and the arms of which extend from opposite sides of the back stop plate and embrace two other opposite sides of the core frame and are secured thereto and resilient cushioning means interposed in the connection between the back stop plate and said arms.

9. In a solenoid, a coil winding having a central passageway, a core frame having pole portions extending along two opposite sides of said coil, a plunger having a shank portion disposed to reciprocate in the coil passageway and having a head portion adapted to overlie the ends of the pole portions and to strike the same at one end of the stroke of the plunger, a base plate overlying the opposite end of the core frame, a pad of resilient cushioning material interposed between the base plate and the core frame, a U-shaped spring clamp embracing the base plate and having its two arms overlapping the two opposite sides of the core frame the ends of said arms being bent into engagement with the core frame tensioning the base plate against the pad and toward the core frame, a generally U-shaped back stop plate assembly the base of which assembly comprises a back stop plate proper disposed across the path of travel of the plunger above the head of the plunger to be struck thereby at the opposite end of the stroke of the plunger and a pair of armlike extensions for the back stop plate proper depending therefrom and overlapping two other opposite sides of the core frame and connected therewith, said back stop plate assembly including resilient cushioning means adapted to absorb the impact of the plunger against the back stop plate.

10. A solenoid as defined in claim numbered 1, characterized in that the stator is provided on opposite sides with depending portions overlapping opposite edges of the pad of resilient material which is interposed between the stator and the base plate.

11. A solenoid as defined in claim numbered 9, characterized in that the core frame is provided on opposite sides with depending portions overlapping opposite edges of the pad which superposes the base plate and the base plate is provided with a recess on its underside in which that portion of the U-shaped clamp which embraces the base plate is disposed.

HOLLIS W. JENCKS.

References Cited in the file of this patent

UNITED STATES PATENTS

| Number | Name | Date |
|---|---|---|
| 1,193,793 | Jones et al. | Aug. 8, 1916 |
| 2,311,890 | Trombetta | Feb. 23, 1943 |
| 2,361,808 | Ayers | Oct. 31, 1944 |
| 2,459,078 | Jeffrey | Jan. 11, 1949 |
| 2,494,350 | Mittermaier | Jan. 10, 1950 |

OTHER REFERENCES

McCurry et al., Abstract Ser. No. 90,412, published March 20, 1951.